Oct. 27, 1964     A. D. STRUBLE, JR     3,154,268
BALLOON AND PARACHUTE COMBINATION
Filed Sept. 19, 1962
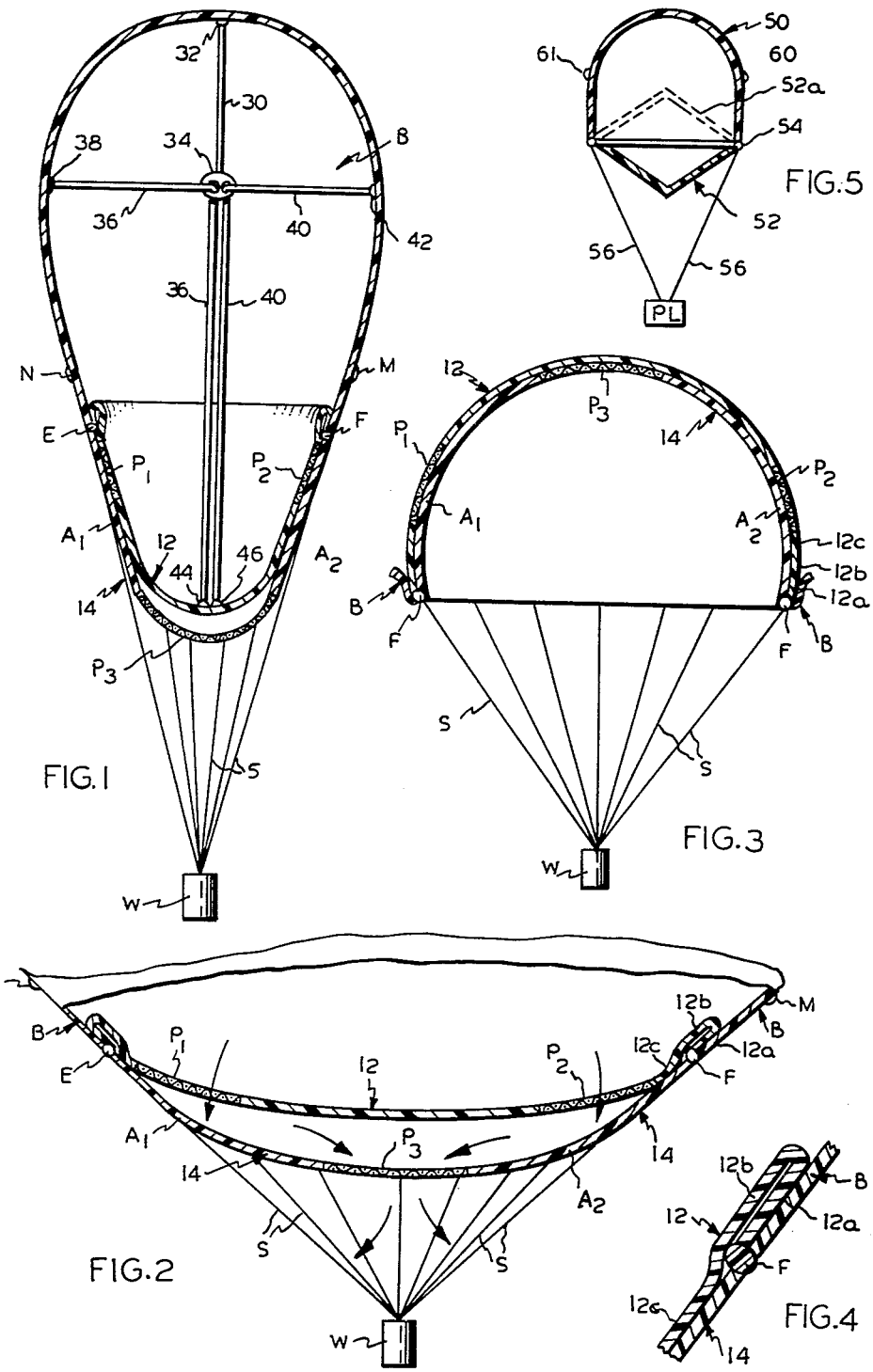

United States Patent Office 3,154,268
Patented Oct. 27, 1964

3,154,268
BALLOON AND PARACHUTE COMBINATION
Arthur D. Struble, Jr., 2101 Rosita Place,
Palos Verdes Estates, Calif.
Filed Sept. 19, 1962, Ser. No. 224,744
9 Claims. (Cl. 244—32)

This invention generally relates to a balloon construction having several novel features. In one embodiment this invention relates to a novel balloon construction which permits at least some degree of automatic regulation of the internal pressure of the balloon. Another novel feature of my balloon is that it has a multi-component envelope, the lower part of which can function as a parachute for the payload carried by the balloon.

As is well known, balloons are becoming increasingly important in the exploration of the upper atmosphere. Such exploration is not only valuable for weather reconnaissance purposes but is also important in scientific investigations of the actual composition of the upper atmosphere. Technology in this field is constantly improving and the workers in the art have been striving for balloons that will go higher and remain aloft longer. Workers also have been striving for balloons that will provide some degree of control over the gas pressure within the balloon so that the balloon will not merely continue to ascend until the balloon envelope bursts. Heavy hardware has been tried, but the weight is a great problem. Still another aim of these workers has been to find some means for returning the human and/or mechanical payload of the balloon once the mission had been completed so that the accumulated information can be safely recovered.

It is therefore an object of this invention to provide a balloon structure which will automatically regulate the internal pressure of the balloon. Another object is to provide a balloon structure which can function as a parachute when needed. Other objects and advantages will be more apparent after reading the following description in conjunction with the drawings.

FIGURE 1 is a perspective view, partly broken away, of a balloon in accordance with this invention;

FIGURE 2 is a fragmentary enlarged view of the balloon shown in FIGURE 1 when said balloon is in a fully expanded condition; and FIGURE 3 is a cross-sectional view illustrating how the balloon of FIGURE 1 can function as a parachute, FIGURE 4 is an enlarged fragmentary cross sectional view of FIGURE 1, FIGURE 5 is a cross sectional view of another embodiment of a balloon.

Referring now to FIGURE 1, a balloon constructed in accordance with one embodiment of this invention is shown in its inflated ascending condition. It will be noted that intermediate the balloon top and bottom there is provided junction seam E–F. The portion of the balloon above E–F may be considered as the upper portion B of the balloon. It will be noted that the lower portion of this balloon (i.e. the portion which is generally below seam E–F) comprises what amounts to two adjacent (but slightly spaced apart) layers of envelope material which, for the sake of convenience, will hereinafter be simply referred to as the upper layer 12 and the lower layer 14. As viewed in FIGURE 1 these layers closely resemble two nested U-shaped or cup-shaped sections. The area and circumferential configuration of upper layer 12 and lower layer 14 are preferably approximately the same. However, the layers are so arranged with respect to each other that they will either be nested together or spaced a distance apart depending upon whether the balloon is ascending or descending and at what rate. For example FIGURE 3 shows the two layers nested together in practically total surface-to-surface contact, while FIGURES 1 and 2 show the layers spaced apart over at least a portion of their adjacent faces. This changing relationship of the layers may be brought about in a number of ways, and one of the simplest ways is illustrated in the drawings. For example it will be seen that the upper edge of the upper layer 12 is attached to the seam E–F, and instead of immediately paralleling the sides of lower layer 14 it goes upwardly parallel to the upper portion B of the balloon envelope and then doubles back downwardly. This is most clearly illustrated by FIGURE 4 which is an enlarged fragmentary view of FIGURE 1, wherein portion 12a of layer 12 is seen to first rise upwardly parallel to upper envelope B, double back along portion 12b and then continue downwardly with a portion 12c which is parallel to lower layer 14. Portion 12a is preferably adhered or otherwise fastened to the adjacent section of envelope B so as to maintain the above described relationship. Portion 12c is not adhered or fastened to layer 14. When descending, the relationship and disposition of portions 12a, 12b and 12c will be approximately as shown in FIGURE 3.

With further reference to the drawings, it will be noted that layers 12 and 14 each contain at least one gas pervious section through which gas can easily pass, while the remainder of each of the layers 12 and 14 consists of substantially gas impervious balloon envelope material. For example, upper layer 12 is shown as containing two such pervious sections $P_1$ and $P_2$ and the lower layer 14 is shown as having but a single pervious section $P_3$. The pervious sections are preferably composed of nylon netting or screening and the impervious portions are preferably composed of plastic, rubber or similar sheet material.

While the balloon is ascending (FIGURE 1) it will be noted that the gas pressure within the balloon will cause the pervious sections $P_1$ and $P_2$ of layer 12 to rest flush against the impervious portions $A_1$ and $A_2$ of the lower layer 14 and escape of the inflation gas within the balloon is thereby effectively prevented.

FIGURE 2 is a fragmentary lower sectional view of the balloon of FIGURE 1 when the balloon has reached a very high altitude and the gas within the balloon has expanded so much that the sides of the balloon diverge outwardly and away from each other to a much greater extent than in FIGURE 1. It will be understood that if there were no means for relieving the pressure of the inflation gas within a balloon under these conditions the balloon envelope might well burst and the collapsed balloon and its payload would fall to the earth. In accordance with my invention this undesirable situation can be prevented by the particular construction and arrangement of the upper and lower layers 12 and 14.

As will be seen in FIGURE 2, when the balloon of the present invention becomes greatly enlarged it will cause pervious sections $P_1$ and $P_2$ of layer 12 to pull away from impervious areas $A_1$ and $A_2$ of lower layer 14. When this occurs the inflation gas within the balloon will have an avenue of escape through sections $P_1$ and $P_2$ into the area between layers 12 and 14 and then outwardly through pervious section $P_3$ of layer 14 into the surrounding atmosphere. In this way, the gas pressure within the balloon can be satisfactorily decreased and as this pressure is decreased the sides of the balloon will come together until pervious sections $P_1$ and $P_2$ of layer 12 again are flush against areas $A_1$ and $A_2$ of layer 14 (as in FIGURE 1) at which time gas can no longer escape from the balloon.

It is thus seen that the particular construction and arrangement in accordance with this invention provide a sort of automatic gas pressure regulator for the balloon. Layers 12 and 14 can be weighted at various points if desired in order to further control their movement relative to each other and in order to achieve a desired degree of gas regulation. The size and location of the pervious and impervious sections in layers 12 and 14 may also be used as a means of controlling the pressure within the balloon. Regulation of the overpressure or superpressure within the balloon is an important factor in balloon operations. The existence and maintenance of a superpressure condition is not necessarily always undesirable and in fact is often desirable for a limited period of time in order to take care of a drop in superheat, diurnal temperature effects, etc.

While FIGURES 1–3 show upper layer 12 as containing two pervious sections $P_1$ and $P_2$ near the outer peripheral edges of the upper layer 12, upper layer 12 could instead have a single pervious section near its center portion. In such an event lower layer 14 would preferably have two or more pervious sections near its outer peripheral edges rather than the single central pervious section shown in FIGURES 1–3. This would insure the desirable valving action described previously. In fact, such an arrangement as just described would be quite desirable when ever the problem of balloon air ingestion is encountered.

FIGURE 1 further illustrates an alternative way in which the upper layer 12 may be moved in relation to the lower layer 14 so that a desired valving action may occur. A suspension cable 30 is shown as having its upper end attached to a junction point 32 near the top of the balloon and the lower end of cable 30 is attached to a two-holed ring structure 34. Two additional cables are shown, the upper end of one cable 36 being joined to a junction point 38 on the left side of the balloon and the upper end of the other cable 40 being attached to another junction point 42 on the opposite side of the balloon. Intermediate their ends, cables 36 and 40 pass through the holes in ring 34 and then have their lower ends attached to junction points 44 and 46 on upper layer 12. With this arrangement it will be seen that as the sides of the balloon diverge outwardly, for instance due to the expansion of the balloon as it ascends, cables 36 and 40 will be pulled upwardly through the holes in ring 34 and this in turn will cause the upper layer 12 to raise upwardly with respect to lower layer 14. When layer 12 has been raised far enough a condition similar to that indicated in FIGURE 2 will exist and inflation gas can escape from the balloon. When enough gas escapes the pressure within the balloon decreases, the sides again come toward each other, and as they do, portions of the cables 36 and 40 will pass downwardly through the holes in ring 34 and the layer 12 will come closer to layer 14 until the impervious sections cover the pervious sections. It is thus seen that depending upon how one might arrange the length of the cables 36 and 40 and their disposition around the sides of the balloon one might achieve any desired degree of pressure regulation within the balloon. The cable arrangement just described is of course only exemplary and not to scale, and numerous other equivalent arrangements will occur to those skilled in this art. Such a cable means could of course also be suitably manipulated by a person riding in the balloon.

Moreover, the construction shown in the drawing can have a further beneficial function insofar as the balloon is concerned, which is preferably, but not necessarily, related to the previously described arrangement and function. This function is probably most clearly illustrated in FIGURE 3. For example, suppose that it is desired (after a long weather reconnaissance flight) to bring a payload W of either humans or weather instruments to earth. This could of course most expeditiously be done by simply dropping the payload W but under most circumstances this would result in the payload crashing to the earth and being destroyed. In accordance with this invention such a problem is solved by making a part of the balloon function as a parachute. Specifically, once it is desired to cause the payload W to descend to earth the upper part of the balloon is detached along the plane defined by circumferential points M–N. Detachment along the plane defined by circumferential lines M–N could be accomplished in a number of suitable ways, and an example of one suitable way would be to place a series of very small explosive charges around the circumference of the balloon at the level of the plane defined by circumferential lines M–N. Such a series of small explosive charges could then be detonated either by a person riding in the payload vehicle W or by remote radio control. After these small explosive charges had been detonated the upper part B of the balloon will obviously separate if the explosive charges are properly spaced. The weight of the payload W will then immediately cause the remaining lower portion of the balloon (which now may essentially only comprise upper layer 12 and lower layer 14) to blossom upwardly and change from the downwardly concave position generally shown by FIGURES 1 and 2 to the upwardly convex position shown by FIGURE 3. In FIGURE 3 it will be noted that upper and lower layers 12 and 14 are pressed tightly together so that each of the pervious sections $P_1$, $P_2$ and $P_3$ are flush against impervious sections of the opposite member. This effectively prevents the escape of air and at the same time the two sections act in concert as a rather strong parachute envelope. The double layer of the lower part of the balloon provides considerable strength for parachute purposes. It will be seen that throughout this operation the plurality of shroud members S will remain attached to the same points (i.e. E–F) around the circumference of the balloon envelope. It is not necessary that the upper part of the balloon envelope be discarded when a parachuting operation is undertaken, since if the upper portion of the balloon is left on while the lower part functions as a parachute, the upper part will merely descend with the parachute—although in some instances the added weight may not be desirable.

FIGURE 5 illustrates a variation upon my previously described inventive concepts and is a cross sectional view of an inflated balloon consisting of an upper balloon section 50 and a lower balloon section 52, said sections being joined together by means of a rigid or semi-rigid ring 54 (e.g. made of a light metal such as aluminum or magnesium). A number of shroud lines 56 are preferably also attached to the ring 54 and the shroud lines may support a payload PL. If the gas within the balloon should escape through the upper balloon section for any reason, the entire balloon structure would of course start to descend. As it descended the lower balloon section would automatically blossom upwardly to the dotted line position 52a, thus functioning as a parachute and permitting the payload to descend at a reasonable rate for subsequent recovery. If desired, a part or all of the upper balloon section 50 may be purposely disengaged from the remainder of the balloon structure by either the proper placement of a series of small explosive charges (e.g. 60, 61) or by a manually manipulated separating means available to a person riding with the balloon.

In conclusion it should be pointed out that both the valve and the parachute are automatic in their operation needing no external control or man to effect their proper function. If the balloon picks up descent speed for any reason sufficient to make the parachute effective, the latter will automatically commence operation. This is also true of the auto-valve that will release overpressures when at a prescribed time so that the balloon will not experience any dangerous structural pressures. The balloon envelope itself has no openings or plumbing in the upper sections. This is highly desirable since conventional designs normally have openings for venting, filling and control near the top of the balloon. If, for any reason, there is a failure or a leak develops in conventional balloons, the balloons will subsequently lose its gas and the mission will have to be aborted. In contrast, the balloon of this invention, having no openings near the top, is basically a much more reliable design.

In review the balloon structure of this invention:
(a) avoids air ingestion,
(b) permits control of superpressure,
(c) allows automatic overpressure venting and insures against rupturing pressures,
(d) provide automatic parachute control,
(e) avoids the problems associated with top openings in parachutes,
(f) permits controlled venting, if desired, by manipulation of a venting lanyard.

While there has been illustrated and described a preferred embodiment of the invention, it is to be understood that since the various details of construction may obviously be varied considerably without really departing from the basic principles and teachings of this invention, I do not limit myself to the precise constructions herein disclosed and the right is specifically reserved to encompass all changes and modifications coming within the scope of the invention as defined in the appended claims. Having thus described my invention, what I claim as new and desire to secure a United States Letters Patent for is:

1. A novel balloon structure comprising:
   (a) an upper balloon portion,
   (b) a lower balloon portion,
   (c) said lower balloon portion comprising two approximately coextensive adjacent layers,
   (d) each of said layers containing at least one section which is readily pervious to gas,
   (e) the remainder of each of said layers being composed of gas impervious material,
   (f) the spacing between said layers being arranged so that at one relative angularity of the sides of the balloon the pervious sections are so disposed that there can be no escape of gas from the balloon and at another more divergent relative angularity the pervious sections are so disposed that at least a part of the gas within the balloon may escape.

2. A balloon structure according to claim 1 wherein said upper and lower balloon portions are separable by separating means located around the circumference of the balloon above the plane defined by the juncture of said layers.

3. A balloon structure according to claim 2 wherein said separating means comprises a peripheral array of explosive charges.

4. A balloon structure according to claim 1 wherein said lower balloon portion is capable of functioning as a parachute when the descent of the balloon exceeds a prescribed speed.

5. A balloon structure according to claim 1 wherein at least one of said layers is attached to the lower end of a cable arrangement so that a predetermined movement of the cable arrangement will separate said layers so as to permit the venting of gas contained within the balloon.

6. A balloon structure according to claim 5 wherein the upper end of said cable arrangement is attached to at least one of the upper sides of the ballon envelope.

7. A balloon structure according to claim 1 wherein the upper of said adjacent layers is provided with at least one central section which is readily pervious to gas and the lower of said adjacent layers is provided with at least one peripheral section which is readily pervious to gas.

8. A balloon structure according to claim 1 wherein the upper of said adjacent layers is provded with at least one peripheral section which is readily pervious to gas and the lower of said adjacent layers is provided with at least one central section which is readily pervious to gas.

9. A balloon structure according to claim 1 wherein a plurality of shroud lines are attached to the balloon structure along substantially the same circumference defined by the juncture of said coextensive adjacent layers.

References Cited in the file of this patent
UNITED STATES PATENTS

| | | |
|---|---|---|
| 991,459 | Schleicher | May 2, 1911 |
| 1,183,796 | Bambaugh | May 16, 1916 |
| 2,415,818 | Frieder et al. | Feb. 18, 1947 |

FOREIGN PATENTS

| | | |
|---|---|---|
| 141,741 | Switzerland | Oct. 16, 1930 |